US012748623B2

(12) United States Patent
Bastoul et al.

(10) Patent No.: US 12,748,623 B2
(45) Date of Patent: Sep. 29, 2026

(54) DATA PROCESSING APPARATUS AND METHOD FOR PROVIDING COMPILER WITH POLYHEDRAL SCHEDULER

(71) Applicant: HUAWEI TECHNOLOGIES CO., LTD., Shenzhen (CN)

(72) Inventors: Cedric Bastoul, Boulogne Billancourt (FR); Zhen Zhang, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 447 days.

(21) Appl. No.: 18/478,587

(22) Filed: Sep. 29, 2023

(65) Prior Publication Data

US 2024/0045716 A1 Feb. 8, 2024

Related U.S. Application Data

(63) Continuation of application No. PCT/EP2021/058116, filed on Mar. 29, 2021.

(51) Int. Cl.
*G06F 9/48* (2006.01)
*G06F 9/38* (2018.01)

(52) U.S. Cl.
CPC .......... *G06F 9/4881* (2013.01); *G06F 9/3838* (2013.01)

(58) Field of Classification Search
CPC ............................ G06F 9/4881; G06F 9/3838
USPC .......................................................... 718/102
See application file for complete search history.

(56) References Cited

U.S. PATENT DOCUMENTS

| | | | | |
|---|---|---|---|---|
| 8,060,870 | B2 | 11/2011 | Eichenberger et al. | |
| 8,584,103 | B2 | 11/2013 | Bondhugula et al. | |
| 11,372,629 | B1 * | 6/2022 | Meister | G06F 8/41 |
| 2006/0236305 | A1 * | 10/2006 | Chang | G06F 8/433 717/106 |
| 2009/0307673 | A1 * | 12/2009 | Eichenberger | G06F 8/452 717/160 |
| 2016/0358103 | A1 * | 12/2016 | Bowers | G06F 9/4881 |
| 2022/0100558 | A1 * | 3/2022 | Jia | G06N 20/00 |

OTHER PUBLICATIONS

Kong et al., "Model-Driven Transformations for Multi- and Many-Core CPUs," PLDI'19. pp. 469-484 (Jun. 22-26, 2019).

(Continued)

*Primary Examiner* — Jacob D Dascomb
(74) *Attorney, Agent, or Firm* — Leydig, Voit & Mayer, Ltd.

(57) ABSTRACT

A data processing apparatus is provided, comprising a processing circuitry configured to implement a scheduling constraints injection entity configured to, based on one or more scheduling constraints, adapt a polyhedral intermediate representation of an input code for obtaining an adapted polyhedral intermediate representation of the input code. The processing circuitry is further configured to implement a polyhedral scheduler configured to generate, based on the adapted polyhedral intermediate representation of the input code, a scheduled polyhedral intermediate representation of the input code. The scheduling constraints injection entity is further configured to, based on the one or more scheduling constraints, adjust the polyhedral scheduler. Moreover, a corresponding data processing method is disclosed.

20 Claims, 9 Drawing Sheets

(56) References Cited

OTHER PUBLICATIONS

Baghdadi et al., "Tiramisu: A Polyhedral Compiler for Expressing Fast and Portable Code," Code Generation and Optimization, IEEE Press, XP058427634, pp. 193-205 (Feb. 16, 2019).
Bastoul et al., "Optimizing GPU Deep Learning Operators with Polyhedral Scheduling Constraint Injection," The International Symposium on Memory Systems, XP058848927, pp. 313-324 (Apr. 2, 2022).
Bondhugula et al., "A Practical Automatic Polyhedral Parallelizer and Locality Optimizer," total 13 pages (Jun. 7-13, 2008).
Vasilache et al., "Tensor Comprehensions: Framework-Agnostic High-Performance Machine Learning Abstractions," arxiv.org, Cornell University Library, XP081223016, total 38 pages (Feb. 13, 2018).
Bondhugula et al., "PLuTo: A Practical and Fully Automatic Polyhedral Program Optimization System," ResearchGate, total 15 pages (Mar. 2, 2008).
Grosser et al., "Polly-Performing Polyhedral Optimizations on a Low-Level Intermediate Representation," Wspc/Instruction File paper, total 27 pages (May 1, 2012).
Verdoolaege et al., "Scheduling for PPCG," Report CW706, total 79 pages (Jun. 2017).
Feautrier, "Some Efficient Solutions to the Affine Scheduling Problem. I. One-Dimensional Time," International Journal of Parallel Programming, vol. 21, No. 5, pp. 313-347 (May 1992).
Li et al., "The Deep Learning Compiler: A Comprehensive Survey," arXiv:2002.03794v2 [cs.DC], vol. 1, No. 1, Article, pp. 1-36 (Feb. 27, 2020).
Elango et al., "Diesel: DSL for Linear Algebra and Neural Net Computations on GPUs," DOI: 10.1145/3211346.3211354, pp. 42-51 (Jun. 18, 2018).

* cited by examiner

```
  for (i = 0; i < N; i++)
    for (k = 0; k < N; k++)
X:     B[i][k] = A[i][k];
  for (i = 0; i < N; i++)
    for (j = 0; j < N; j++)
      for (k = 0; k < N; k++)
Y:      C[i][j] += B[i][k] + D[k][i][j];
```

Fig. 1

```
  forall (i = 0; i < N; i++)
    forall (k = 0; k < N; k++)
X:     B[i][k] = A[i][k];
  forall (i = 0; i < N; i++)
    forall (j = 0; j < N; j++)
      for (k = 0; k < N; k++)
Y:      C[i][j] += B[i][k] + D[k][i][j];
```

Fig. 2

```
  forall (i = 0; i < N; i++)
    for (k = 0; k < N; k++)
      forall (j = 0; j < N; j++)
X:        B[i][k] = A[i][k];
Y:        C[i][j] += B[i][k] + D[k][i][j];
```

Fig. 8

DATA PROCESSING APPARATUS AND METHOD FOR PROVIDING COMPILER WITH POLYHEDRAL SCHEDULER

CROSS-REFERENCE TO RELATED APPLICATIONS

This application is a continuation of International Application No. PCT/EP2021/058116, filed on Mar. 29, 2021, the disclosure of which is hereby incorporated by reference in its entirety.

TECHNICAL FIELD

Embodiments of the present disclosure relate to data processing. More specifically, the present disclosure relates to a data processing apparatus and method implementing a polyhedral scheduler for a compiler.

BACKGROUND

Deep Learning (DL) is developing extremely fast, supported by the availability of big data, large processing power and convenient high-level abstractions. For efficiently developing and optimizing DL algorithms, compilers should support fast high-level prototyping and efficient low-level parallel code generation. In a compiler, scheduling is responsible for a variety of critical optimization actions and decisions, i.e. dealing with scheduling constraints which may conflict with each other, such as parallelism extraction (i.e. locating parallel blocks and loops, including external parallel loops and/or internal parallel loops), permutability extraction (i.e. locating loops that can be partitioned into smaller chunks, i.e. "tiling" transformation), fusion and/or fission (i.e. combining computations together or not), data locality optimization (i.e. performing computations that reuse the same data closer to each other), and enforcing specific data access patterns. Depending on the input problem and target architecture, often some scheduling constraints may be more critical than others. Polyhedral schedulers were developed to address linear algebra and scientific computing kernels for multicore CPU architectures more than a decade ago. With the recent emergence of artificial intelligence and machine learning frameworks, we are facing a multiplication of situations with a growing number of operators to be executed on various target architectures. "One-size-fits-all" scheduling algorithms are failing at finding the best optimization for every cases. For instance, conventional automatic schedulers may not optimize DL operators, i.e. software functions or modules in the best way for the desired target architecture. FIG. 1 shows a computational kernel that is a simplified version of a real-life fused operator we will use as a running example throughout this document. A conventional polyhedral scheduler may process the computation kernel shown in FIG. 1, i.e. analyze, parallelize and optimize it to the final version shown in FIG. 2. Although the conventional polyhedral scheduler is capable of successfully extracting parallel loops denoted by the "forall" keywords, the final code illustrated in FIG. 2 is far from optimal, in particular with respect to DL optimizations. This is because, the final code illustrated in FIG. 2, firstly, is not a perfectly nested loop and, secondly, the access to the main tensor D[k][i][j] is inefficient due to long jumps in the memory space at every iteration of the innermost loop.

SUMMARY

The present disclosure provides a data processing apparatus and method for implementing a more flexible and efficient polyhedral scheduler for a compiler.

According to a first aspect, a data processing apparatus is provided, comprising a processing circuitry configured to implement a scheduling constraints injection entity (herein also referred to as scheduling constraints injection engine) configured to, based on one or more scheduling constraints, adapt a polyhedral intermediate representation of an input code, i.e. source code for obtaining an adapted polyhedral intermediate representation of the input code. Moreover, the processing circuitry is configured to implement a constraints prioritized polyhedral scheduler configured to generate, based on the adapted polyhedral intermediate representation of the input code, a scheduled polyhedral intermediate representation of the input code. The scheduling constraints injection entity is further configured to adjust, based on the one or more scheduling constraints, the constraints prioritized polyhedral scheduler. Thus, advantageously, a data processing apparatus implementing a more flexible and efficient polyhedral scheduler for a compiler is provided.

In a further possible implementation form of the first aspect, the scheduling constraints injection entity is configured to further adjust the constraints prioritized polyhedral scheduler based on the polyhedral intermediate representation of the input code. In other words, the scheduling constraints injection entity may be configured to adjust the constraints prioritized polyhedral scheduler based on both the one or more scheduling constraints and the polyhedral intermediate representation of the input code.

In a further possible implementation form of the first aspect, the polyhedral intermediate representation of the input code comprises one or more affine sets and/or functions defining iteration domain information, data access information and/or ordering information about the input code.

In a further possible implementation form of the first aspect, the processing circuitry is further configured to process, i.e. compile the input code into an executable output code based on the scheduled polyhedral intermediate representation of the input code.

In a further possible implementation form of the first aspect, the data processing apparatus further comprises a communication interface and/or user interface configured to receive the one or more scheduling constraints and to provide the one or more scheduling constraints to the scheduling constraints injection entity.

In a further possible implementation form of the first aspect, the one or more scheduling constraints are defined by one or more text files, binary files and/or encoded files.

In a further possible implementation form of the first aspect, the scheduling constraints injection entity comprises a constraints dispatcher configured to extract from each of the one or more scheduling constraints a domain information portion for defining iteration domain information and a prioritized scheduling information portion for defining constraints.

In a further possible implementation form of the first aspect, the scheduling constraints injection entity further comprises a data dependence analysis unit configured to, based on the one or more scheduling constraints, in particular the domain information portion received from the constraints dispatcher, adapt the polyhedral intermediate representation of the input code for obtaining the adapted polyhedral intermediate representation of the input code.

In a further possible implementation form of the first aspect, the data dependence analysis unit is further configured to locate one or more iteration pairs subject to a data dependence relation within the polyhedral intermediate representation of the input code and to generate, based on the one or more scheduling constraints, in particular the domain information portion thereof received from the constraints dispatcher, one or more affine sets for the one or more iteration pairs.

In a further possible implementation form of the first aspect, the scheduling constraints injection entity further comprises a validity constraint builder configured to generate, based on the one or more affine sets for the one or more iteration pairs received from the data dependence analysis unit one or more affine constraints for one or more scheduling coefficients associated with, i.e. part of or defined by the scheduled polyhedral intermediate representation of the input code and to adjust the constraints prioritized polyhedral scheduler based on the one or more affine constraints.

In a further possible implementation form of the first aspect, the scheduling constraints injection entity further comprises a built-in optimization constraints entity configured to generate, based on the one or more affine sets for the one or more iteration pairs received from the data dependence analysis unit, one or more cost functions and to provide the one or more cost functions to the constraints prioritized polyhedral scheduler for adjusting, in particular optimizing the constraints prioritized polyhedral scheduler based on the one or more cost functions.

In a further possible implementation form of the first aspect, the scheduling constraints injection entity further comprises an external constraint builder configured to receive the prioritized scheduling information portion for the one or more scheduling constraints from the constraints dispatcher and to generate, based on the prioritized scheduling information portion for the one or more scheduling constraints, one or more affine constraints for one or more scheduling coefficients associated with, i.e. part of or defined by the scheduled polyhedral intermediate representation of the input code.

In a further possible implementation form of the first aspect, the constraints prioritized polyhedral scheduler comprises a scheduling entity, which may implement a scheduling algorithm, configured to generate the scheduled polyhedral intermediate representation of the input code, based on the adapted polyhedral intermediate representation of the input code and the one or more affine constraints for the one or more scheduling coefficients associated with, i.e. part of or defined by the scheduled polyhedral intermediate representation of the input code.

In a further possible implementation form of the first aspect, the one or more affine constraints for the one or more scheduling coefficients associated with, i.e. part of or defined by the scheduled polyhedral intermediate representation of the input code comprise priority information, i.e. are prioritized.

In a further possible implementation form of the first aspect, the constraints prioritized polyhedral scheduler further comprises an integer linear programming solver configured to determine the one or more scheduling coefficients associated with, i.e. part of or defined by the scheduled polyhedral intermediate representation of the input code, based on the one or more affine constraints and one or more cost functions, in particular the one or more cost functions provided by the built-in optimization constraints entity.

In a further possible implementation form of the first aspect, the constraints prioritized polyhedral scheduler further comprises a prioritized scheduling constraint system builder configured to disable one or more of the one or more affine constraints for the one or more scheduling coefficients associated with, i.e. part of or defined by the scheduled polyhedral intermediate representation of the input code for allowing convergence towards a solution by the integer linear programming solver.

According to a second aspect a data processing method is provided. The data processing method comprises the steps of:

- adapting a polyhedral intermediate representation of an input code, based on one or more scheduling constraints, for obtaining an adapted polyhedral intermediate representation of the input code;
- adjusting a constraints prioritized polyhedral scheduler, based on the one or more scheduling constraints; and
- generating, based on the adapted polyhedral intermediate representation of the input code, a scheduled polyhedral intermediate representation of the input code using the adjusted constraints prioritized polyhedral scheduler.

In a further possible implementation form of the second aspect, the step of adjusting the constraints prioritized polyhedral scheduler comprises adjusting the constraints prioritized polyhedral scheduler, based on the one or more scheduling constraints and the polyhedral intermediate representation of the input code.

In a further possible implementation form of the second aspect, the method further comprises the step of processing, i.e. compiling the input code into an executable output code based on the scheduled polyhedral intermediate representation of the input code.

The data processing method according to the second aspect of the present disclosure can be performed by the data processing apparatus according to the first aspect of the present disclosure. Thus, further features of the data processing method according to the second aspect of the present disclosure result directly from the functionality of the data processing apparatus according to the first aspect of the present disclosure and its different implementation forms described above and below.

According to a third aspect, a computer program or a computer program product is provided, which comprises a computer-readable storage medium carrying program code which causes a computer or a processor to perform the method according to the second aspect when the program code is executed by the computer or the processor.

The different aspects of the present disclosure can be implemented in software and/or hardware.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIGS. 1 and 2 show an input code and an output code provided by a polyhedral scheduler;

FIG. 8 shows an output code provided by a polyhedral scheduler implemented by a data processing apparatus according to an embodiment.

Figure 3A:
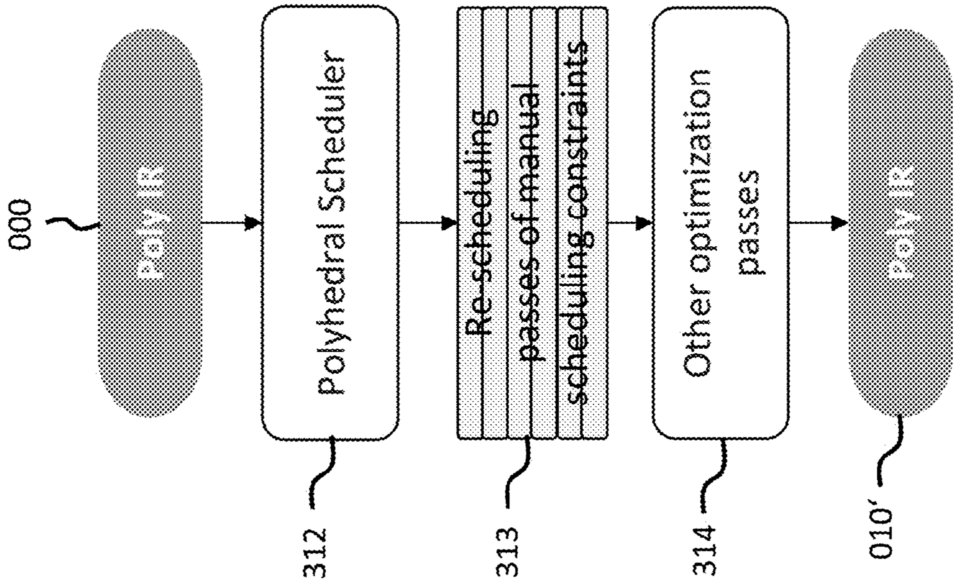
FIG. 3*a* is a schematic diagram illustrating a compilation processing flow based on a polyhedral scheduler.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless specifically noted otherwise.

As will be described in more detail below, embodiments disclosed herein implement a polyhedral scheduler for processing an input code or a portion thereof, i.e. computational kernel into an output code. As will be appreciated, polyhedral schedulers are using linear algebra to model and to compute an ordering for all iterations of a computational kernel. This ordering is expressed, for each statement, in the form of a multidimensional affine function which associates iterations of the statement to a logical date. As will be further appreciated, the three main abstractions manipulated by polyhedral schedulers and their notations are: (1) iteration domains which represent executions of statements, (2) affine access relations which encode the accesses to data, and (3) affine scheduling functions which encode the ordering.

The application domain of polyhedral schedulers is loop-based programs where the bounds of the loops and the conditions of the tests are affine constraints on the loop iterators and the global parameters that are not known but have a fixed value during the execution of the computational kernel. Under this assumption, a particular execution of a statement can be totally determined by the value of the surrounding loop iterators, called the "iteration vector". All the executions of a statement of a computational kernel may be represented with the set of all possible iteration vectors.

In the example shown in FIG. 1 the computational kernel has two statements X and Y. Statement X is enclosed inside two loops: loop i bounded by constraints i>=0 and i<N and loop k bounded by constraints k>=0 and k<N. In this code, N is a parameter. Any execution of the statement X is determined by the iteration vector (i, k). All the executions of X can be modeled by the set of all possible iteration vectors. This may be expressed in the following way:

$$[N]->\{X(i,k):0\le i<N \text{ and } 0\le k<N\}$$

The left side shows the parameter N while the right side presents the set of iteration vectors (i,k) of statement X, bounded by affine constraints 0≤i<N and 0≤k<N. Equivalently statement Y may be expressed as follows:

$$[N]\rightarrow\{Y(i,j,k):0\le i<N \text{ and } 0\le j<N \text{ and } 0\le k<N\}$$

Combining the above expressions all the iteration domains of the computational kernel shown in FIG. 1 may be expressed in the following way:

$$[N]\rightarrow\{X(i,k):0\le i<N \text{ and } 0\le k<N;Y(i,j,k):0\le i<N \text{ and } 0\le j<N \text{ and } 0\le k<N\}$$

Affine access relations aim at specifying the accesses of data within the computational kernel. To model accesses, polyhedral schedulers use multidimensional affine relations which map every iteration of iteration domains to memory space locations of multidimensional arrays. In the example shown in FIG. 1, the statement Y whose executions are determined by the iteration vector (i,j,k) makes an access to array D using reference D[k][i][j]. This may be expressed in the following way:

$$[N]\rightarrow\{D\_Y(i,j,k)=(k,i,j)\},$$

where (i,j,k) corresponds to the iteration vector and (k,i,j) corresponds to the mapping for each dimension of array D. Here each dimension mapping is an affine function of the iterators and the parameter, the first is equal to k, the second to i, and the third to j. All accesses to data in the example can be modeled in the following way:

$$[N]\rightarrow\{B\_X(i,k)=(i,k);A\_X(i,k)=(i,k);C\_Y(i,j,k)=(i,j);B\_Y(i,j,k)=(i,k);D\_Y(i,j,k)=(k,i,j)\}.$$

Affine scheduling functions aim at specifying the relative ordering of all iterations of all iteration domains (iteration domains do not encode ordering, they are only sets in the mathematical sense). To model such ordering, polyhedral schedulers use multidimensional affine functions that associate every iteration of iteration domains to a logical date. Each dimension of the function is an affine expression of the iteration vector dimensions and the parameters. Logical dates are multidimensional: they encode a date with several components in a lexicographic way (like days, hours, minutes, seconds, etc.). Such affine scheduling functions are expressive enough to model arbitrary sequences of all classical loop transformations (loop fusion, fission, reversal, interchange, skewing, strip-mining, tiling, shifting, etc.).

For instance, the following scheduling functions encode exactly the order of the iterations of the computational kernel shown in FIG. 1:

$$[N]\rightarrow\{X(i,k)=(0,i,k,0);Y(i,j,k)=(1,i,j,k)\}$$

For this example, there is one scheduling function for each statement (both are 4-dimensional and map iterations to the same time space). For instance, it is specified that iteration i=2 and k=1 noted (2,1) of statement X is executed at logical date X(2,1)=(0,2,1,0), i.e. at "day 0, hour 2, minute 1, second 0", or that the iteration i=2, j=0, k=1 noted (2,0,1) of statement Y is executed at logical date Y(2,0,1)=(1,2,0,1), i.e. at "day 1, hour 2, minute 0, second 1". Hence iteration (2,1) of X is executed before iteration (2,0,1) of Y. It may be noted that all iterations of X are executed at "day 0" while all iterations of Y are executed at "day 1", which models the separation of the two external loops in the computational kernel. The second dimension of X corresponds to the expression i (specifying that lower values of i are executed before higher values of i) which corresponds to the first loop, and the same reasoning applies to all other scheduling dimensions. Finally, it may be checked that the scheduling functions model a total order for all iterations and that it corresponds to the iteration order in the example computational kernel.

There is no limit to the number of scheduling dimensions, but the expression for each dimension can only be an affine expression of the iteration vector dimensions and the parameters (because there exist algorithms to generate the code that implements an ordering modelled in this way). Hence the general form of scheduling functions for the example shown in FIG. 1 and as used by embodiments disclosed herein is:

```
[N] -> {
X(i,k) =     (t_X_0_i * i + t_X_0_k * k + t_X_0_N * N + t_X_0_ 1 * 1,
              t_X_ 1_i * i + t_X_1_k * k + t_X_1_N * N + t_X_1_1 * 1,
              ...
              t_X_n_i * i + t_X_n_k * k + t_X_n_N * N + t_X_n_1 * 1);
Y(i,j,k) =   (t_Y_0_i * i + t_Y_0_j * j + t_Y_0_k * k + t_Y_0_N * N + t_Y_0_1 * 1,
             t_Y_1_i * i + t_Y_1_j * j + t_Y_1_k * k + t_Y_1_N * N + t_Y_1_1 * 1,
             ...
             t_Y_n_i * i + t_Y_n_j * j + t_Y_n_k * k + t_Y_n_N * N + t_Y_n_1 * 1)
}
```

The role of the polyhedral scheduler is to compute scheduling functions, which corresponds to finding the various scheduling coefficients in the expression above (all the t_* coefficients such as t_X_0_i denoting the scheduling coefficient multiplying i at dimension 0 for statement X).

Figure 3B:
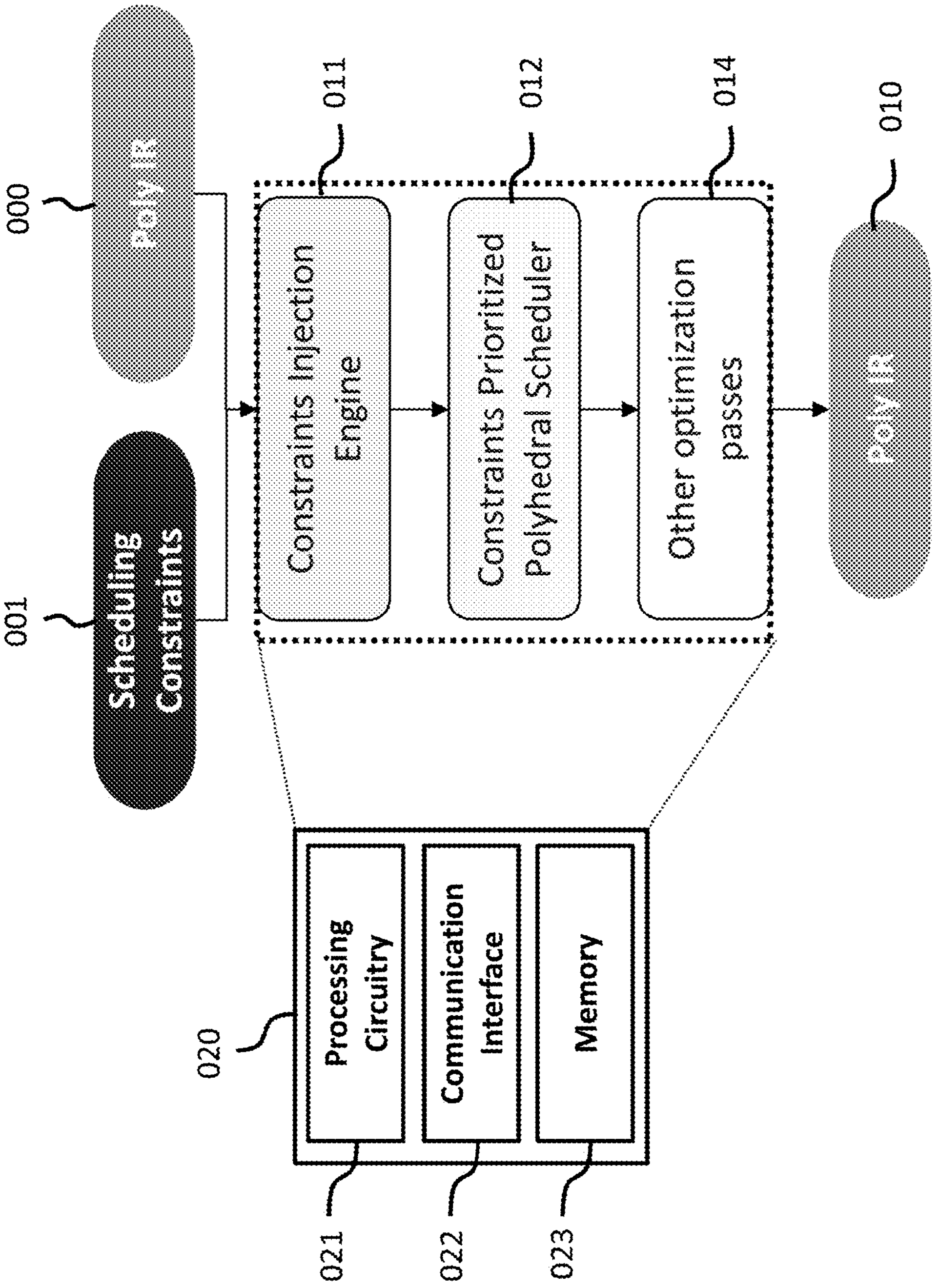
FIG. 3*b* is a schematic diagram illustrating a data processing apparatus according to an embodiment and a compilation processing flow based on a polyhedral scheduler implemented by the data processing apparatus according to an embodiment.

FIG. 3*a* is a schematic diagram illustrating a compilation processing flow based on a polyhedral scheduler, while FIG. 3*b* is a schematic diagram illustrating a data processing apparatus 020 according to an embodiment and a compilation processing flow based on a polyhedral scheduler 012 implemented by the data processing apparatus 020.

In the conventional compilation processing flow illustrated in FIG. 3*a*, a conventional polyhedral scheduler 312 processes an input polyhedral intermediate representation 000. This may be followed by generally time consuming and complex rescheduling passes of manual scheduling constraints 313 and other optimization passes 314 to produce the output polyhedral intermediate representation 010'.

In contrast therewith, the data processing apparatus 020 illustrated in FIG. 3*b* enables a fine control over polyhedral scheduling with injection of scheduling constraints 001 with user-specified priorities. These constraints may impact different aspects of the scheduling computation process to influence the computation towards the best scheduling, which may comprise one or more other optimization passes 014. As illustrated in FIG. 3*b*, the data processing apparatus 020 may comprise a processing circuitry 021, a communication and/or user interface 022 and a memory 023. The processing circuitry 021 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The memory 023 may be configured to store executable program code which, when executed by the processing circuitry 021, causes the data processing apparatus 020 to perform the functions and operations described herein.

As will be described in more detail under further reference to FIG. 4, the processing circuitry 021 of the data processing apparatus 020 is configured to implement a scheduling constraints injection entity (herein also referred to as scheduling constraints injection engine) 011 configured to, based on one or more scheduling constraints 001, adapt a polyhedral intermediate representation 000 of an input code, i.e. source code for obtaining an adapted polyhedral intermediate representation of the input code. Moreover, the processing circuitry 021 of the data processing apparatus 020 is configured to implement a constraints prioritized polyhedral scheduler 012 configured to generate, based on the adapted polyhedral intermediate representation of the input code, a scheduled polyhedral intermediate representation of the input code 010. The scheduling constraints injection entity 011 is further configured to adjust, based on the one or more scheduling constraints, the constraints prioritized polyhedral scheduler 012.

Figure 4:
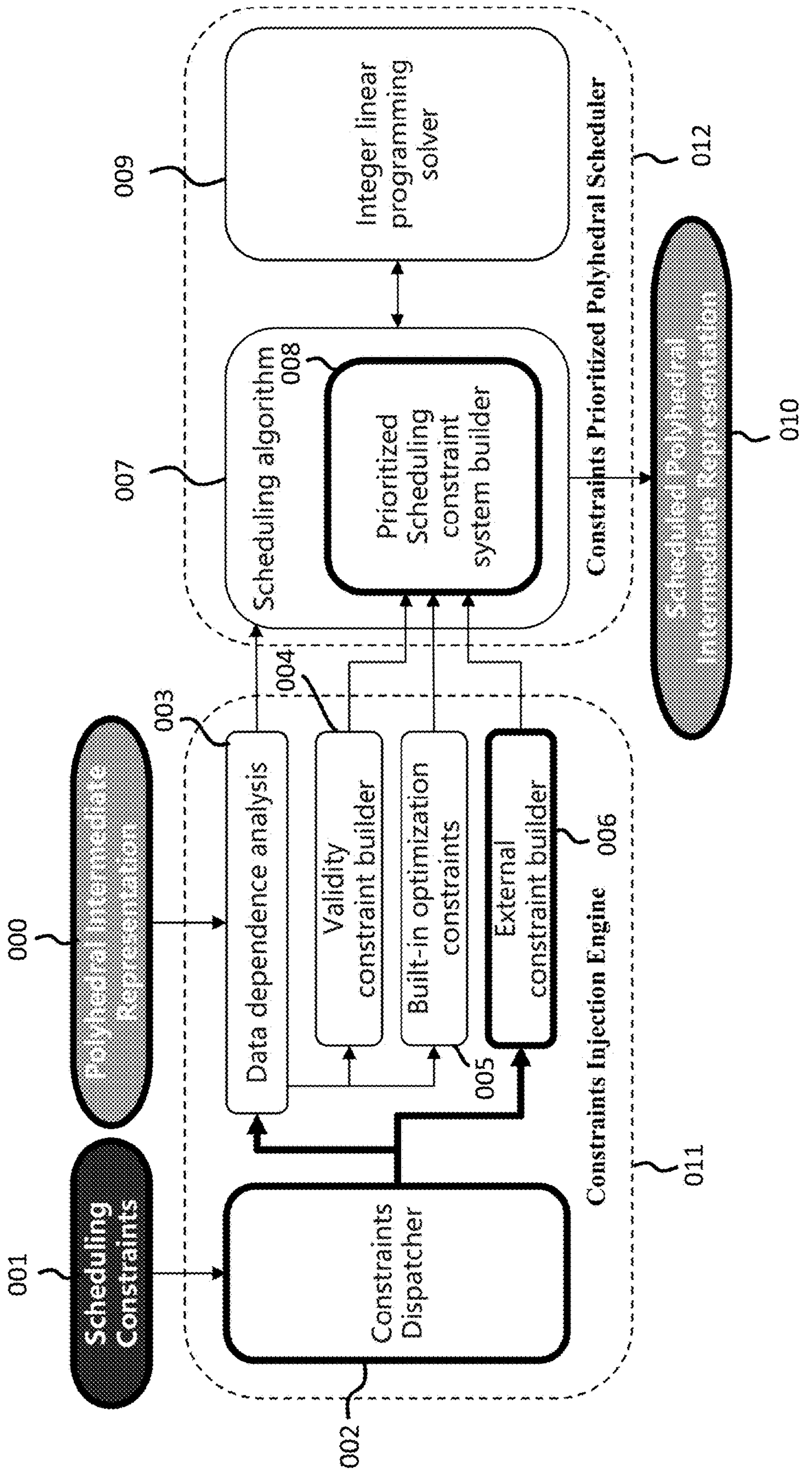
FIG. 4 is a schematic diagram illustrating in more detail elements of a data processing apparatus according to an embodiment.

In the embodiment shown in FIG. 4, the scheduling constraints injection entity 011 is configured to further adjust the constraints prioritized polyhedral scheduler 012 based on the polyhedral intermediate representation of the input code. In other words, in the embodiment shown in FIG. 4, the scheduling constraints injection entity 011 is configured to adjust the constraints prioritized polyhedral scheduler based on both the one or more scheduling constraints and the polyhedral intermediate representation of the input code, as will be described in more detail in the following.

In FIG. 4 the following elements are shown, which will be described in more detail further below:

000: The polyhedral intermediate representation, which is the input of the data processing apparatus 020.

001: The scheduling constraints, which may be provided via a user interface of the data processing apparatus 020. This allows injecting the domain-specific scheduling constraints 001 into the data processing apparatus 020. In an embodiment, the scheduling constraints 001 may be formatted as text files, binary files or encoded files.

002: A constraints dispatcher, which parses the input scheduling constraints 001 into domain constraints and the scheduling constraints, as will be described in more detail below in the context of FIG. 5.

003: A data dependency analysis entity, which allows to build the data-dependency analysis with the domain constraints.

004: A validity constraint builder configured to generate the constraints necessary to assert the semantical correctness of the scheduling, i.e., to maintain the logical behavior specified by the input polyhedral intermediate representation 000.

005: A built-in optimization constraints entity configured to generate the basic polyhedral optimization constraints.

006: An external constraint builder configured to generate the external constraints as an affine model.

007: A scheduling entity implementing a scheduling algorithm based on a prioritized scheduling constraint system builder 008.

009: An integer linear programming (ILP) solver configured to solve the ILP problem with the constraints and the optimization function.

010: The scheduled polyhedral intermediate representation, which may be the output of the data processing apparatus 020.

Embodiments disclosed here allow controlling the constraints prioritized polyhedral scheduler 012 by injecting appropriate constraints 001. While conventional polyhedral schedulers may focus on extracting parallelism and improving data locality, embodiments disclosed herein may add new objectives and/or prioritized objectives, e.g., without loss of generality, allow adapting the polyhedral scheduler 012 to generate (1) perfectly nested loops (single loop with all statements in the innermost loop) and (2) efficient data access patterns (avoiding long jumps in memory). Those two properties are highly desirable when targeting hardware accelerators such as GPUs and other types of chips.

In the following embodiments of the data processing apparatus 020 will be described in more detail on the basis of the input code, i.e. computational kernel shown in FIG. 1, namely:

```
   for (i = 0; i < N; i++)
     for (k = 0; k < N; k++)
X:     B[i][k] = A[i][k];
   for (i = 0; i < N; i++)
     for (j = 0; j < N; j++)
       for (k = 0; k < N; k++)
Y:       C[i][j] += B[i][k] + D[k][i][j];
```

As already described above, a conventional polyhedral scheduler is able to compute scheduling X(i,k)=(0, i, k) with parallel dimensions 1 and 2, and Y(i, j, k)=(1, i, j, k) with parallel dimensions 1 and 2. This polyhedral scheduling corresponds to the target code shown in FIG. 2, namely:

```
   forall (i = 0; i < N; i++)
     forall (k = 0; k < N; k++)
X:     B[i][k] = A[i][k];
   forall (i = 0; i < N; i++)
     forall (j = 0; j < N; j++)
       for (k = 0; k < N; k++)
Y:       C[i][j] += B[i][k] + D[k][i][j];
```

As already described above, although parallelism denoted by "forall" loops has been successfully extracted by the conventional polyhedral scheduler, the final code has two issues: (1) two loop nests have been generated and (2) the access to D[k][i][j] is inefficient because every iteration of the innermost loop achieves a long "jump" in the memory space. As will be described in the following, both of these issues may be addressed by the data processing apparatus 020 according to an embodiment based on the injection of suitable scheduling constraints.

As already described above, the input of the data processing apparatus 020 comprises two sets of information, namely the polyhedral intermediate representation 000 of the code and the scheduling constraints 001.

In an embodiment, the polyhedral intermediate representation 000 may include (1) iteration domain information, (2) data access information and (3) ordering information in the form of affine sets and functions. For instance, for the input code shown in FIG. 1, the polyhedral intermediate representation 000 may include the following information:

Iteration domains (which model statement executions):

$$[N]\rightarrow\{X(i,k):0\geq i<N \text{ and } 0\geq k<N;Y(i,j,k):0\geq i<N \text{ and } 0\geq j<N \text{ and } 0\geq k<N\}$$

Access functions (which model accesses to data):

```
[N] -> {B_X(i,k) = (i,k);
  A_X(i,k) = (i,k);
  C_Y(i,j,k) = (i,j);
  B_Y(i,j,k) = (i,k);
  D_Y(i,j,k) = (k,i,j)}
```

Order functions (which model original ordering of statement iteration executions):

$$[N]\rightarrow\{X(i,k)=(0,i,k);Y(i,j,k)=(1,i,j,k)\}$$

The scheduling constraints 001 may be provided a specific text format or an API. For instance, for the input code shown in FIG. 1 the scheduling constraints 001 may be represented in the following way.

#Scheduling constraints

#—Domain $$[N]\rightarrow\{X(i,j,k): 0\geq i<N \text{ and } 0\geq j<N \text{ and } 0\geq k<N\}$$

#—Schedule $$[N]\rightarrow\{X(i,j,k)=(!j+?1,!j+?2,j+?3);Y(i,j,k)=(!j+?1,!j+?2,j+?3)\}$$

In an embodiment, the semantics of the above scheduling constraints may be as follows.

Domain: the domain part specifies the iteration domain constraints for the statement X: it aims at replacing the iteration domain constraints specified in the input polyhedral representation 000.

Schedule: the schedule part specifies constraints to be considered by the scheduling algorithm 007. For the example above, they specify that (1) the two statements are scheduled in the same way for their first three dimensions (expressed by similar scheduling for both statements), (2) the first and second dimensions must *not* be scheduled according to j (expressed by the "!j" sub-expression) without other constraints (expressed by the "+?1" or "+?2" sub-expressions: adding a question mark specifies that the remaining part of the affine expression is free, however a numbered question mark may constrain those free coefficients to be equal amongst various expressions), and (3) the third dimension *has* to be scheduled according to j (expressed by the "j" sub-expression) without other constraint (specified by the "+?3" sub-expression).

In an embodiment, the constraints prioritized polyhedral scheduler 012 of the data processing apparatus 020 is configured to compute the coefficients of the affine scheduling for each statement, and meta-information about all affine scheduling dimensions such as whether the dimension is parallel or not. For the example described above, the form of the affine scheduling (determined by the polyhedral scheduler 012) may be as follows:

```
[N] -> {
TX(i,k)   = (t_X_0_i * i + t_X_0_k * k + t_X_0_N * N + t_X_0_1 * 1,
          t_X_1_i * i + t_X_1_k * k + t_X_1_N * N + t_X_1_1 * 1,
          t_X_2_i * i + t_X_2_k * k + t_X_2_N * N + t_X_2_1 * 1);
TY(i,j,k) = (t_Y_0_i * i + t_Y_0_j * j + t_Y_0_k * k + t_Y_0_N * N + t_Y_0_1 * 1,
          t_Y_1_i * i + t_Y_1_j * j + t_Y_1_k * k + t_Y_1_N * N + t_Y_1_1 * 1,
          t_Y_2_i * i + t_Y_2_j * j + t_Y_2_k * k + t_Y_2_N * N + t_Y_2_1 * 1)
}
```

Thus, as will be appreciated, in an embodiment, the constraints prioritized polyhedral scheduler 012 is configured to determine and output an optimal value for each t_* coefficient.

Some of the aspects described above will be explained in more detail in the following under further reference to FIGS. 5, 6 and 7.

Figure 5:
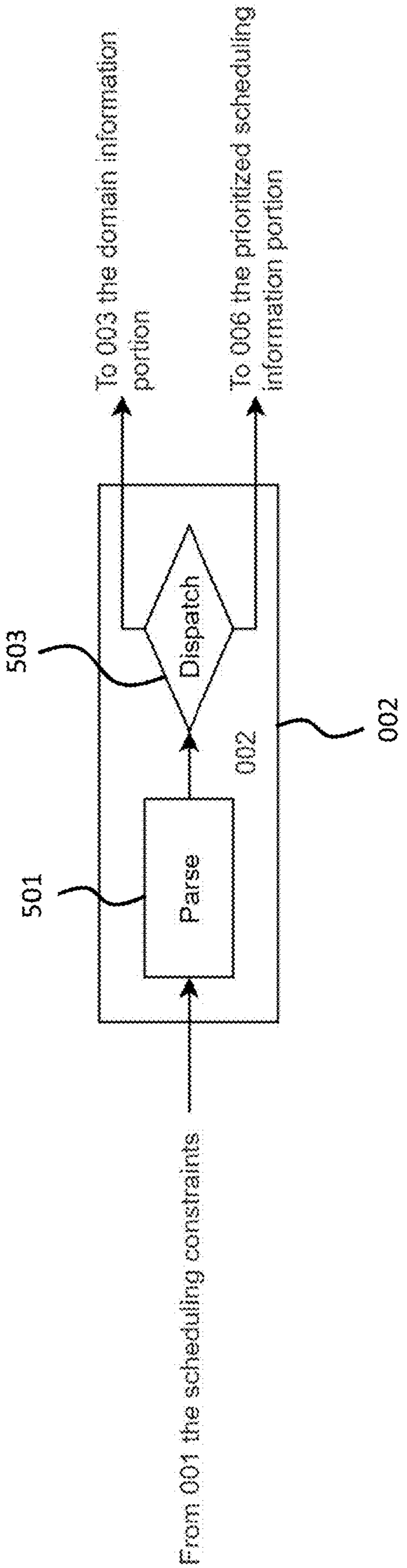
FIG. 5 is a schematic diagram illustrating in more detail a constraints dispatcher of a data processing apparatus according to an embodiment.

As illustrated in FIG. 5 and as already described above, in an embodiment, the constraints dispatcher 002 may receive the scheduling constraints 001 to be injected in the form of either a specific file format or API calls. The constraints dispatcher 002 is further configured to raise these scheduling constraints 001 to internal data structures (processing block 501) and to separate them depending on their type (processing block 503). This separation allows submitting the scheduling constraints 001 depending on their type either to the data dependence analysis unit 003 (namely, as illustrated in FIG. 5, the domain information portion) or to the polyhedral scheduling algorithm 007 after being processed by the external constraint builder 006 (namely, as illustrated in FIG. 5, the prioritized scheduling information portion), as will be described in more detail below.

For the example already described above, the constraints dispatcher 002 is configured to process and send the "domain" constraints "[N]→{X(i,j,k): 0≥i<N and 0≥j<N and 0≥k<N}" to the data dependence analysis unit 003, while the schedule portion "[N]→{X(i,j,k)=(!j+?1, !j+?2, j+?3); Y(i,j,k)=(!j+?1, !j+?2, j+?3)}" is sentto the external constraint builder 006.

Figure 6:
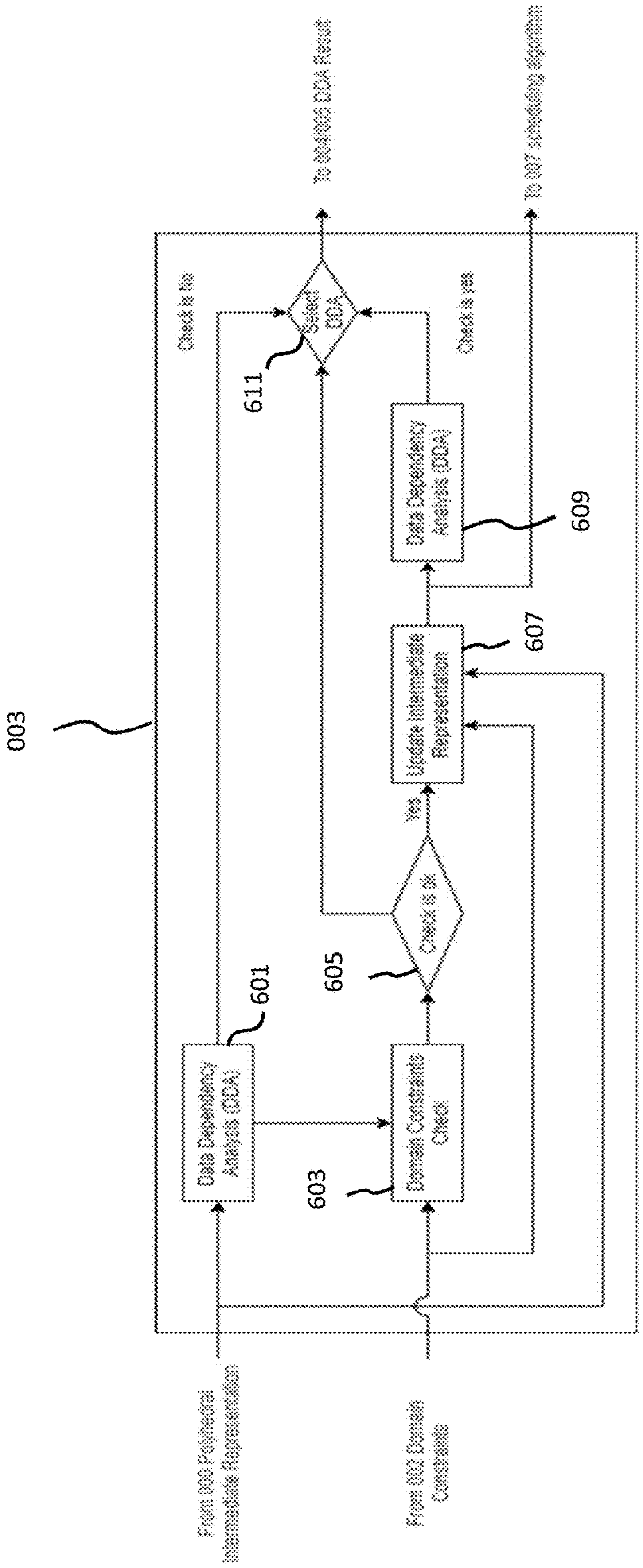
FIG. 6 is a schematic diagram illustrating in more detail a data dependence analysis entity of a data processing apparatus according to an embodiment.

As illustrated in FIG. 6, in an embodiment, the data dependence analysis entity 003 receives the polyhedral representation 000 of the input code and additional constraints from the constraints dispatcher 002. The data dependence analysis (DDA) entity 003 is configured to find iterations with a data dependence relation within the polyhedral representation 000 of the input code and to express these iterations by means of affine sets. The additional constraints are used for altering the input polyhedral intermediate representation 000. In an embodiment, the data dependence analysis entity 003 may perform a normal Data Dependence Analysis 601 to check whether the alteration does not modify the semantics of the input problem with a Domain Constraint Check 603. If the check is successful 605, the alteration can be made by the Update Intermediate Representation entity 607 and the Data Dependence Analysis is achieved again including alterations 609. Depending on the Check entity 605, the output of the initial Data Dependence Analysis 601 or the output of the Data Dependence Analysis after updating the intermediate representation 609 is selected as output by the Select entity 611.

For the example describe above, the additional constraints expand the iteration domain of the statement X. The data dependence analysis entity 003 asserts the correctness and applies the alteration. The output is the following altered set of iterations in dependence relation which is provided to the validity constraint builder 004 and the built-in optimization constraints entity 005:

```
D_XY=[N]→{(ix,jx,kx,iy,jy,ky)|0<=ix<=N
    &&0<=jx<=N &&0<=kx<=N &&0<=iy<=N
    &&0<=jy<=N &&0<=ky<=N && ix==iy &&
    kx==ky}

D_YsYt=[N]→{(is,js,ks,it,jt,kt)0<=is<=N
    &&0<=js<=N &&0<=ks<=N &&0<=it<=N
    &&0<=jt<=N &&0<=kt<=N &&
    is==it&&js==jt&&kt>ks}
```

In an embodiment, the validity constraint builder 004 is configured to translate the input data dependence affine sets into constraints on scheduling coefficients which must be respected at any time for the final code to be semantically equivalent to the input code. To this end, in an embodiment, the validity constraint builder 004 may implement the translation mechanism disclosed in Feautrier, P. Some efficient solutions to the affine scheduling problem. I. One-dimensional time. Int J Parallel Prog 21, 313-347 (1992), which is fully incorporated herein by reference. This translation mechanism encodes the fact that the relative order of iterations in dependence relation must be respected in the final code:

Y(i,j,k)−X(i,j,k)>0 for all iterations in D_XY (translated to affine constraints on scheduling coefficients with Feautrier translation mechanism), Yt(i,j,k)−Ys(i,j,k)>0 for all iterations in D_YsYt (translated to affine constraints on scheduling coefficients with Feautrier translation mechanism).

In an embodiment, the built-in optimization constraints entity 005 is configured to translate input data dependence affine sets into affine constraints and one or more cost functions which should be minimized for the final code to be optimized. To this end, in an embodiment, the built-in optimization constraints entity 005 may implement the translation mechanism disclosed in Uday Bondhugula, Albert Hartono, J. Ramanujam, P. Sadayappan A practical automatic polyhedral parallelizer and locality optimizer PLDI '08: Proceedings of the 29th ACM SIGPLAN Conference on Programming Language Design and Implementation June 2008 Pages 101-113, which is fully incorporated herein by reference. This translation mechanism encodes the optimization of outer parallelism and data locality:

uXY*N+wXY−(Y(i,j,k)−X(i,j,k))>0 for all iterations in D_XY (translated to affine constraints on scheduling coefficients with Feautrier translation mechanism), uYY*N+wYY−(Yt(i,j,k)−Ys(i,j,k))>0 for all iterations in D_YsYt (translated to affine constraints on scheduling coefficients with Feautrier translation mechanism), minimize (uXY,uYY,wXY,wYY).

In an embodiment, the external constraint builder 006 is configured to translate constraints received from the constraint dispatcher 002 into affine constraints on scheduling coefficients. In the example described above the encoding may be as follows:

t_X_0_j=0 && t_Y_0_j=0 && t X 0 i=t_Y_0_i&&t_X_0_k=t Y 0 k&&t_X_0 N=t Y_0_N&&t X 0 1=t_Y_0_1 && t_X_1_j=0&& t_Y_1_j=0 && t_X_1 i=t_Y_1_i&&t_X_1_k=t_Y_1_k&&t_X_1_N=t_Y_1_N&&t_X_1_1=t_Y_1_1 && t_X_2_j=1 && t_Y_2_j=1 && t_X_2 i=t_Y_2_i&&t_X_2_k=tY_2_k &&t_X_2_N=tY_2_N &&t_X_2_1=t_Y_2_1

Figure 7:
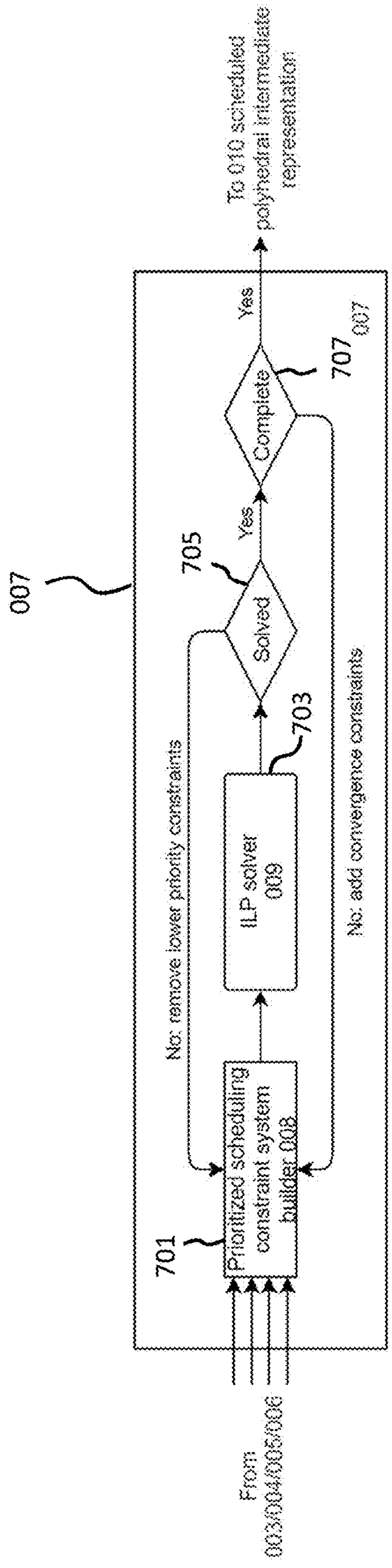
FIG. 7 is a schematic diagram illustrating in more detail a scheduling entity implementing a scheduling algorithm of a data processing apparatus according to an embodiment.

As illustrated in FIG. 7, in an embodiment, the scheduling entity 007, e.g. the scheduling algorithm 007 is configured to compute all the scheduling coefficients taking into account (1) the adapted polyhedral intermediate representation provided by the data dependence analysis 003, (2) the validity constraints provided by the validity constraint builder 004, (3) the optimization constraints and cost functions provided by the built-in optimization constraints entity 005 and (4) the external constraints provided by the external constraint builder entity 006, considering all of them by means of the prioritized scheduling constraint system builder 008. In an embodiment, the scheduling algorithm implemented by the scheduling entity may be based on the algorithm disclosed in Uday Bondhugula, Albert Hartono, J. Ramanujam, P. Sadayappan A practical automatic polyhedral parallelizer and locality optimizer PLDI '08: Proceedings of the 29th ACM SIGPLAN Conference on Programming Language Design and Implementation June 2008 Pages 101-113, already mentioned above with specific mechanisms to process the additional constraints. The algorithm iteratively finds scheduling coefficients for each scheduling dimension. At each dimension the prioritized scheduling constraint system builder entity 008 builds a constraint system and calls the integer linear programming solver 009 to find coefficients. For converging towards a solution the scheduling algorithm constraints may be relaxed if they prevent the computation of a solution in the presence of the constraints provided by the external constraint builder 006 as checked by the Solved entity 705. In an embodiment, the constraints provided by the external constraint builder 006 may be relaxed with different priority levels, if they prevent the computation of a solution. Once a scheduling dimension has been computed, the above process will be repeated for a new scheduling dimension until the Complete entity 707 states the scheduling is complete.

For the example described above, the scheduling algorithm implemented by the scheduling entity 007 may compute the following scheduling coefficients with the additional constraints:

```
[N] -> {
TX(i,j,k) = (1 * i + 0 * j + 0 * k + 0 * N + 0 * 1,
        0 * i + 0 * j + 1 * k + 0 * N + 0 * 1,
        0 * i + 1 * j + 0 * k + 0 * N + 0 * 1) = (i, k, j);
```

-continued

```
TY(i,j,k) = (1 * i + 0 * j + 0 * k + 0 * N + 0 * 1,
        0 * i + 0 * j + 1 * k + 0 * N + 0 * 1,
        0 * i + 0 * j + 0 * k + 0 * N + 0 * 1) = (i, k, j)
}
```

As will be appreciated, for this example, dimensions 0 and 2 are analyzed as parallel. An additional internal dimension is added to denote the statement ordering at the innermost level, and the final output 010 may comprises the following information.

Iteration domains (model statement executions):

$$[N]\rightarrow\{X(i,j,k)\text{: } 0\geq i<N \text{ and } 0\geq j<N \text{ and } 0\geq k<N;$$

$$Y(i,j,k)\text{: } 0\geq i<N \text{ and } 0\geq j<N \text{ and } 0\geq k<N\}$$

Access functions (model access to data):

```
[N] -> {B_X(i,k) = (i,k);
  A_X(i,k) = (i,k);
  C_Y(i,j,k) = (i,j);
  B_Y(i,j,k) = (i,k);
  D_Y(i,j,k) = (k,i,j)}
```

Order functions (model original ordering of statement executions):

$$[N]\rightarrow\{X(i,k)=(0,i,k);Y(i,j,k)=(1,i,j,k)\}$$

Scheduling functions and meta information:

$$[N]\rightarrow\{TX(i,j,k)=(i,k,j,0);TY(i,j,k)=(i,k,j,1)\}$$

with dimensions 0 and 3 parallel.

This output using polyhedral abstractions corresponds to the output code illustrated in FIG. 8. As will be appreciated, in comparison with the output code shown in FIG. 2 (provided by a conventional polyhedral scheduler), the output code shown in FIG. 8 (provided by the data processing apparatus 020 according to an embodiment) exhibits a perfectly nested loop and efficient memory access for all data, and hence is more appropriate when targeting, for instance, AI/DL accelerators.

As will be appreciated, embodiments disclosed herein add a new interface for constraint injection to a polyhedral scheduler as well as all the mechanisms to process the injected constraints. As already described above, polyhedral schedulers are modelling computational kernels using linear algebra, manipulate abstractions such as sets, functions and relations with affine constraints, and compute the solution based on an integer linear programming solver. Embodiments disclosed herein use similar abstractions for controlling the computation of a scheduling. Injected constraints may affect different parts of the usual processing flow of a polyhedral scheduler depending on their nature. In an embodiment, the constraint dispatcher 002 parses the input scheduling constraints 001 and determines where to inject each constraint in the processing flow. In an embodiment, the external constraint builder 006 prepares the constraints 001 for their processing within the scheduling algorithm 007. In an embodiment, the data dependence analysis entity 003 is configured to take into account constraints on iteration domains, thereby allowing a safe iteration domain extension to enable optimization by recomputing. In an embodiment, the scheduling algorithm 007 computes the polyhedral scheduling while taking into account new constraints and managing their priorities.

Thus, embodiments disclosed herein enable the fine-grain control of the polyhedral scheduling optimization process. Prior art solutions to control polyhedral scheduling can offer only a limited set of global constraints and optimization objectives (limited because they belong to a pre-defined set, and global because they target all statements and their memory accesses in the same way). In contrast thereto, embodiments disclosed herein allow to input any additional affine constraint. The fine-grain constraint injection makes it possible to address various optimization objectives and to solve performance anomalies for a specific statement or memory access. Moreover, embodiments disclosed herein provide an interface expressive enough to range from complete scheduling specification to slightly influence the optimization process towards the best solution, including the possibility to control the iteration domains and enable optimization by re-computation. Embodiments disclosed herein extend conventional polyhedral scheduling algorithms such that new constraints may be processed with existing ones, finding the best overall optimization without breaking previous scheduling optimizations, and making sure by polyhedral scheduling design that the final scheduling is semantically correct. Embodiments disclosed herein offer a way to improve scheduling without any additional development effort or additional rescheduling pass which complicates the compiler.

Figure 9:
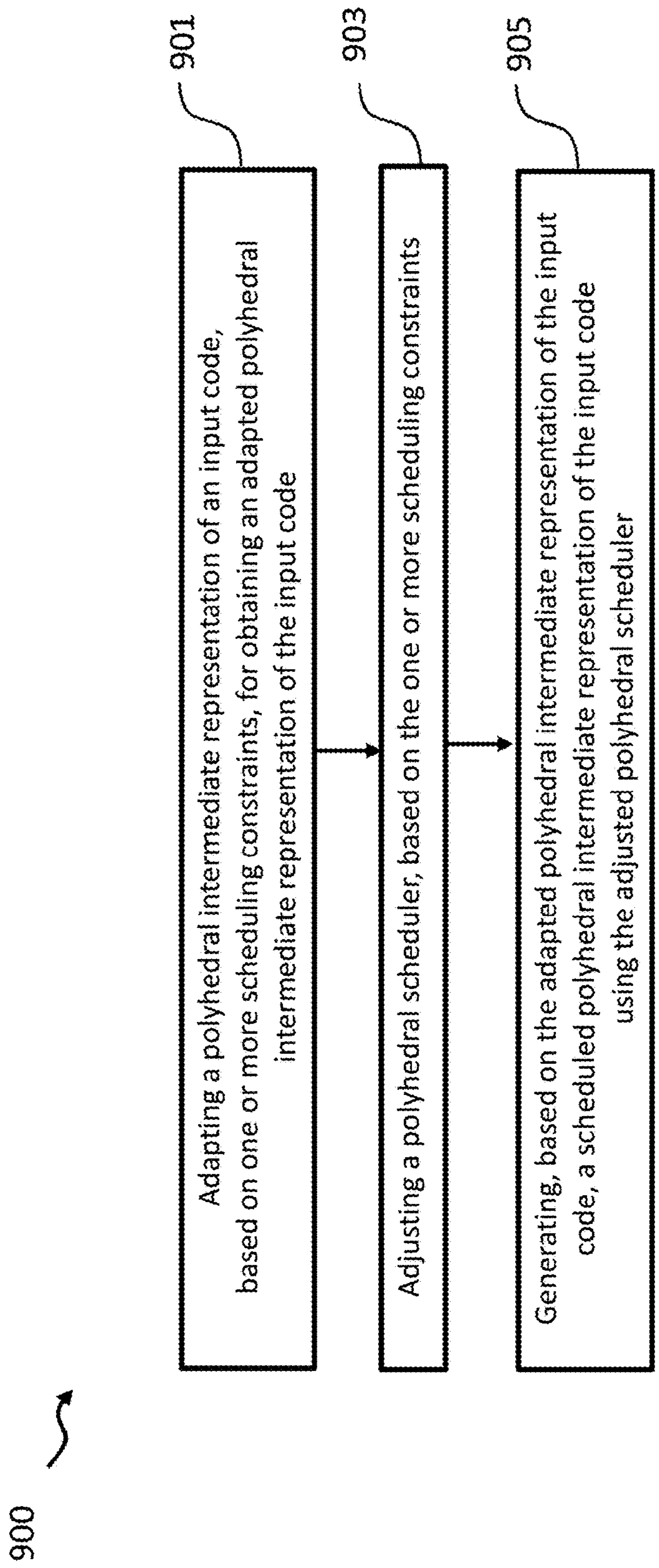
FIG. 9 is a flow diagram illustrating a data processing method according to an embodiment.

FIG. 9 is a flow diagram of a corresponding data processing method 900. In an embodiment, the data processing method 900 may be implemented, i.e. performed by the data processing apparatus 020. The data processing method 900 comprises a first step 901 of adapting a polyhedral intermediate representation 000 of an input code, based on one or more scheduling constraints 001, for obtaining an adapted polyhedral intermediate representation of the input code. The data processing method 900 further comprises a step 903 of adjusting the constraints prioritized polyhedral scheduler 012, based on the one or more scheduling constraints 001. The data processing method 900 comprises a further step 905 of generating, based on the adapted polyhedral intermediate representation of the input code, a scheduled polyhedral intermediate representation 010 of the input code using the adjusted constraints prioritized polyhedral scheduler 012.

In a further possible implementation form of the second aspect, the step of adjusting the constraints prioritized polyhedral scheduler comprises adjusting the constraints prioritized polyhedral scheduler, based on the one or more scheduling constraints and the polyhedral intermediate representation of the input code.

In a further possible implementation form of the second aspect, the method further comprises the step of processing, i.e. compiling the input code into an executable output code based on the scheduled polyhedral intermediate representation of the input code.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A data processing apparatus, comprising:
processing circuitry configured to implement:
a scheduling constraints injection entity configured to:
receive scheduling constraints with user-specified priorities,
separate the scheduling constraints with the user-specified priorities into domain information constraints and prioritized scheduling constraints,
adapt a polyhedral intermediate representation of an input code based on the domain information constraints,
compute data dependence affine sets based on the adapted polyhedral intermediate representation of the input code,
translate the data dependence affine sets into validity constraints comprising constraints on scheduling coefficients, optimization constraints comprising affine constraints, and cost functions, and
translate the prioritized scheduling constraints into external constraints comprising affine constraints on scheduling coefficients;
and polyhedral scheduler configured to generate, based on the validity constraints, the optimization constraints, the cost functions, the external constraints, and the adapted polyhedral intermediate representation of the input code, a scheduled polyhedral intermediate representation of the input code
wherein the scheduling constraints injection entity is further configured to relax the external constraints comprising the affine constraints on the scheduling coefficients with different priority levels.

2. The data processing apparatus of claim 1, wherein the processing circuitry is further configured to process the input code into an executable output code based on the scheduled polyhedral intermediate representation of the input code.

3. The data processing apparatus of claim 1, further comprising a communication interface and/or user interface, configured to receive the scheduling constraints with the user-specified priorities and to provide the scheduling constraints with the user-specified priorities to the scheduling constraints injection entity.

4. The data processing apparatus of claim 1, wherein the of scheduling constraints with the user-specified priorities are defined by one or more text files, binary files and/or encoded files.

5. The data processing apparatus of claim 1, wherein the scheduling constraints injection entity further comprises a constraints dispatcher configured to perform the separation of the scheduling constraints with the user-specified priorities into the domain information constraints and the prioritized scheduling constraints.

6. The data processing apparatus of claim 1, wherein the scheduling constraints injection entity further comprises data dependence analysis circuitry configured to perform the adapting the polyhedral intermediate representation of the input code based on the domain information constraints for obtaining the adapted polyhedral intermediate representation of the input code.

7. The data processing apparatus of claim 5, wherein the scheduling constraints injection entity further comprises an external constraint builder, configured to receive the prioritized scheduling constraints from the constraints dispatcher and to generate, based on the prioritized scheduling constraints, one or more affine constraints for one or more scheduling coefficients associated with the scheduled polyhedral intermediate representation of the input code.

8. The data processing apparatus of claim 1, wherein the polyhedral scheduler further comprises an integer linear programming solver, configured to determine the one or more scheduling coefficients based on the affine constraints of the external constraints and the cost functions, wherein the one or more scheduling coefficients are associated with the scheduled polyhedral intermediate representation of the input code.

9. The data processing apparatus of claim 8, wherein the polyhedral scheduler further comprises a prioritized scheduling constraint system builder, configured to disable one or more of the affine constraints of the external constraints for the one or more scheduling coefficients associated with the scheduled polyhedral intermediate representation of the input code.

10. The data processing apparatus of claim 1, wherein the polyhedral intermediate representation of the input code comprises one or more affine sets and/or functions defining iteration domain information, data access information and/or ordering information about the input code.

11. A data processing method applied to an electronic device, the method comprising:

performing, by a scheduling constraints injection entity:
- receiving scheduling constraints with user-specified priorities,
- separating the scheduling constraints with the user-specified priorities into domain information constraints and prioritized scheduling constraints,
- adapting a polyhedral intermediate representation of an input code, based on the domain information constraints;
- computing data dependence affine sets based on the adapted polyhedral intermediate representation of the input code,
- translating the data dependence affine sets into validity constraints comprising constraints on scheduling coefficients, optimization constraints comprising affine constraints, and cost functions,
- translating the prioritized scheduling constraints into external constraints comprising affine constraints on scheduling coefficients; and performing, by a polyhedral scheduler:
- generating, based on the validity constraints, the optimization constraints, the cost functions, the external constraints, and the adapted polyhedral intermediate representation of the input code, a scheduled polyhedral intermediate representation of the input code.

12. The data processing method of claim 11, further comprising adjusting, by the scheduling constraints injection entity, the polyhedral scheduler based on the scheduling constraints with the user-specified priorities and the polyhedral intermediate representation of the input code.

13. The data processing method of claim 11, further comprising:

processing the input code into an executable output code based on the scheduled polyhedral intermediate representation of the input code.

14. A non-transitory computer-readable storage medium storing program code, which upon execution by a computer or a processor, causes the computer or the processor to perform the data processing method according to claim 11.

15. A data processing apparatus, comprising:

processing circuitry configured to implement:
- a scheduling constraints injection entity; and
- a polyhedral scheduler;

wherein the scheduling constraints injection entity is configured to adapt a polyhedral intermediate representation of an input code for obtaining an adapted polyhedral intermediate representation of the input code, based on one or more scheduling constraints, wherein the scheduling constraints injection entity comprises a constraints dispatcher configured to extract from each of the one or more scheduling constraints a domain information portion and a prioritized scheduling information portion, wherein the polyhedral scheduler is configured to cooperate with the processing circuitry to generate, based on the adapted polyhedral intermediate representation of the input code, a scheduled polyhedral intermediate representation of the input code;

wherein the scheduling constraints injection entity is further configured to adjust the polyhedral scheduler, based on the one or more scheduling constraints.

16. The data processing apparatus of claim 15, wherein the scheduling constraints injection entity further comprises an external constraint builder, configured to receive the prioritized scheduling information portion for the one or more scheduling constraints from the constraints dispatcher and to generate, based on the prioritized scheduling information portion for the one or more scheduling constraints, one or more affine constraints for one or more scheduling coefficients associated with the scheduled polyhedral intermediate representation of the input code.

17. The data processing apparatus of claim 16, wherein the polyhedral scheduler comprises a scheduling entity, configured to generate the scheduled polyhedral intermediate representation of the input code, based on the adapted polyhedral intermediate representation of the input code and the one or more affine constraints for the one or more scheduling coefficients associated with the scheduled polyhedral intermediate representation of the input code.

18. The data processing apparatus of claim 17, wherein the one or more affine constraints for the one or more scheduling coefficients associated with the scheduled polyhedral intermediate representation of the input code comprise priority information.

19. The data processing apparatus of claim 17, wherein the polyhedral scheduler further comprises an integer linear programming solver, configured to determine the one or more scheduling coefficients associated with the scheduled polyhedral intermediate representation of the input code, based on the one or more affine constraints and one or more cost functions.

20. The data processing apparatus of claim 16, wherein the polyhedral scheduler further comprises a prioritized scheduling constraint system builder, configured to disable one or more of the one or more affine constraints for the one or more scheduling coefficients associated with the scheduled polyhedral intermediate representation of the input code.

* * * * *